US006421425B1

(12) United States Patent
Bossi et al.

(10) Patent No.: US 6,421,425 B1
(45) Date of Patent: Jul. 16, 2002

(54) AUTOMATED COMMUNICATIONS ASSISTANT FOR THE SOUND-IMPAIRED

(75) Inventors: Burt Joseph Bossi; David Michael Claus; Douglas R. White, all of Indianapolis, IN (US)

(73) Assignee: AT&T Corp, New York, NY (US)

( * ) Notice: Subject to any disclaimer, the term of this patent is extended or adjusted under 35 U.S.C. 154(b) by 0 days.

(21) Appl. No.: 09/135,235

(22) Filed: Aug. 17, 1998

(51) Int. Cl.$^7$ ............................................. H04M 11/00
(52) U.S. Cl. .................. 379/52; 379/90.01; 379/93.15; 370/352
(58) Field of Search ................................ 379/52, 93.15, 379/93.35, 93.09, 93.17, 93.21, 93.23, 93.24, 90.01; 370/352

(56) References Cited

U.S. PATENT DOCUMENTS

| 5,163,081 A | 11/1992 | Wycherley et al. |
| 5,381,466 A | 1/1995 | Shibayama et al. |
| 5,406,557 A | 4/1995 | Baudoin |
| 5,712,901 A | 1/1998 | Meermans |
| 5,787,148 A | 7/1998 | August |
| 5,805,587 A | * 9/1998 | Norris et al. ............... 370/352 |
| 5,809,128 A | * 9/1998 | McMullin ................ 379/93.35 |
| 5,917,888 A | 6/1999 | Giuntoli |
| 5,943,395 A | * 8/1999 | Hansen ........................ 379/52 |
| 6,078,581 A | * 6/2000 | Shtivelman et al. ........ 370/352 |
| 6,219,413 B1 | * 4/2001 | Burg ....................... 379/93.35 |

OTHER PUBLICATIONS

"Telecommunication Interfaces for Deaf People" by N.A. Osman–Allu, published in Computing and Control Division, Colloquium on "Special Needs and the Interface,"0 *IEE Colloquium*, Jan. 13, 1993.

* cited by examiner

Primary Examiner—Stella Woo

(57) ABSTRACT

A communications system is designed to allow sound-impaired persons to communicate with sound-unimpaired individuals via the Internet. When a sound-impaired person at a Text Teletypewriter (TTY) terminal initiates a call that is destined for a sound-unimpaired person, the communications system ascertains whether the sound unimpaired person is currently using the Internet and, if so, automatically completes the call over the Internet and the communications system without the help of any communications assistant.

32 Claims, 4 Drawing Sheets

AUTOMATED COMMUNICATIONS ASSISTANT FOR THE SOUND-IMPAIRED

FIELD

This invention relates to a method and apparatus to help Internet users communicate with hearing and speech-impaired individuals while such individuals are using a Baudot-based device.

BACKGROUND

In an effort to make the benefits of communications technology available to everyone, regardless of any disability that a particular person may have, most communications carriers offer a service called "Telecommunications Relay Service" TRS for short. In essence, the service allows sound-impaired persons, i.e., hearing- and/or speech-impaired individuals, to communicate with each other as well as with sound-unimpaired persons using special user-based devices and customized network-based facilities. User-based devices typically used by sound-impaired persons are Telecommunications Devices for the Deaf (TDD), better known as Text Teletypewriters (TTY). Such a device is a specialized terminal with a keyboard on which text characters are typed for conversion to tones using well-known Baudot-format. A TTY device is generally coupled to a communications line that carries the tones across a communications network to a corresponding TTY where the tones are re-converted to characters that are displayed on the screen of the corresponding TTY device. Force of habit and governmental subsidies that help defray the cost of each TTY device have made such device the preferred communications device of the majority of sound-impaired persons.

The customized network-based facilities that serve sound-impaired individuals are either Operator Services for the Deaf (OSD) or Telecommunications Relay Service (TRS). The OSD facility relays text communications back and forth between TTYs being used by two sound-impaired individuals. The TRS facility permits conversation between a sound-unimpaired individual and a sound-impaired person. Such conversation is generally facilitated by a communications assistant who types the speech signals received from the sound-unimpaired individual for delivery to the TTY of the sound-impaired individual, and correspondingly reads the text data that is received from the sound-impaired individual, for delivery to the telephone set of the sound-unimpaired individual.

The active participation of the communications assistant in a conversation between a sound-impaired user and a sound-unimpaired person, although beneficial, is nevertheless expensive and intrusive. The relatively high cost associated with the participation of a communications assistant in the conversation is due to the fact that an assistant must be dedicated to each conversation. Although the cost of providing TRS facility is typically governmentally subsidized, sound-impaired individuals fully realize that, absent the current governmental generosity, the mere existence of universal communications service for the sound-impaired may be in jeopardy.

In response to this problem, some network designers have proposed the concept of implementing Speech-To-Text (STT) and Text-To-Speech (TTS) conversion technology at the TRS platform. Unfortunately, while TTS technology has been successfully implemented in a wide variety of applications, STT technology is still in its infancy due to a variety of technical issues, including problems related to vocabulary independence and speech recognition for signals transmitted via communications lines. Furthermore, sound-impaired individuals tend to use some idiomatic expressions that are not easily recognizable by the general public and that are not easily adaptable to existing SST systems.

Sound-impaired users have long complained about the lack of privacy in their conversation with sound-unimpaired persons due to the active participation of the communications assistant who is in effect a non-invited, albeit needed, eavesdropper to a private conversation. Thus, a problem of the prior art is lack of an intruder-free, affordable, universally available system to provide communications services to sound-impaired individuals

SUMMARY

We have realized that while the vast majority of sound-impaired individuals use TTY devices for their telecommunications needs, a significant number of sound-unimpaired communications users who place calls to sound-impaired individuals are Internet users.

The present disclosure is directed to a communications system that allows Baudot-formatted text data from TTY devices to be carried over the Internet after such text data has been converted to the Transmission Control Protocol/Internet Protocol (TCP/IP) required for communications over the Internet. Analogously, TCP/IP packets that originate from a sound-unimpaired Personal Computer (PC) and that are destined for the TTY of a sound-impaired person are received at a server on the Internet where such packets are converted to Baudot-formatted text data for delivery to the TTY of the sound-impaired person.

In an embodiment of the principles disclosed herein, a sound-impaired person wishing to communicate with a sound-unimpaired person directs a call and associated call setup information to a TRS platform. The call setup information includes the telephone number of the desired called party, i.e., the sound-unimpaired person. Upon receiving the call setup information, the TRS platform launches a query to a database that maps the called party's telephone number to the IP address of the called party. Upon retrieving the IP address of the IPS server, the TRS platform instructs its protocol conversion server to access a commercially available web site to ascertain whether the called party is presently using the Internet. If so, the called party is alerted to the presence of the call from the sound-impaired person. Upon receiving a signal indicative of the willingness of the called party to answer the call via the Internet network, the TRS platform establishes a two-leg virtual connection between the called party's PC and the TTY of the caller, i.e., the sound-impaired person. The first leg of the connection—a circuit-switched connection—couples the caller's TTY to the protocol conversion server while the second leg of the connection—a packet-switched connection—couples the protocol conversion server to the called party's PC. After the two-leg connection is established, the TRS platform separates itself from the connection.

If the called party is not currently using the Internet, the TRS platform places a conventional call to the called party urging such party to establish an immediate Internet connection to the protocol conversion server. When such connection is established, the TRS platform bridges the caller's TTY to that connection and drops out of the loop.

When a sound-unimpaired caller wishes to communicate with a sound-impaired called party, the caller can either place a conventional TDD call or an Internet-TDD call. If the call is a conventional TDD call, the call is completed to the TRS platform, which delivers an announcement to the caller to inform such caller that an Internet call to the TTY user would afford the caller more privacy at a cheaper rate. The announcement also communicates to the caller the Universal Resource Locator (URL) of the Internet-TDD website on the protocol conversion server. Thereafter, the TRS platform completes the call in a conventional manner. If the call is an Internet call, an Internet connection is established from the caller's PC to the protocol conversion server. Once the connection is established, IP data packets received from the caller are converted to Baudot format characters at the protocol conversion server before being forwarded to the called party's TTY. Correspondingly, Baudot-format characters received from the called party's TTY are packetized in conformance with the IP protocol before being forwarded to the Internet caller.

Advantageously, the present disclosure eliminates the need for sound-unimpaired persons who communicate frequently with sound-impaired individuals to purchase a TTY whose use is dedicated to such communications.

DETAILED DESCRIPTION

Figure 1:
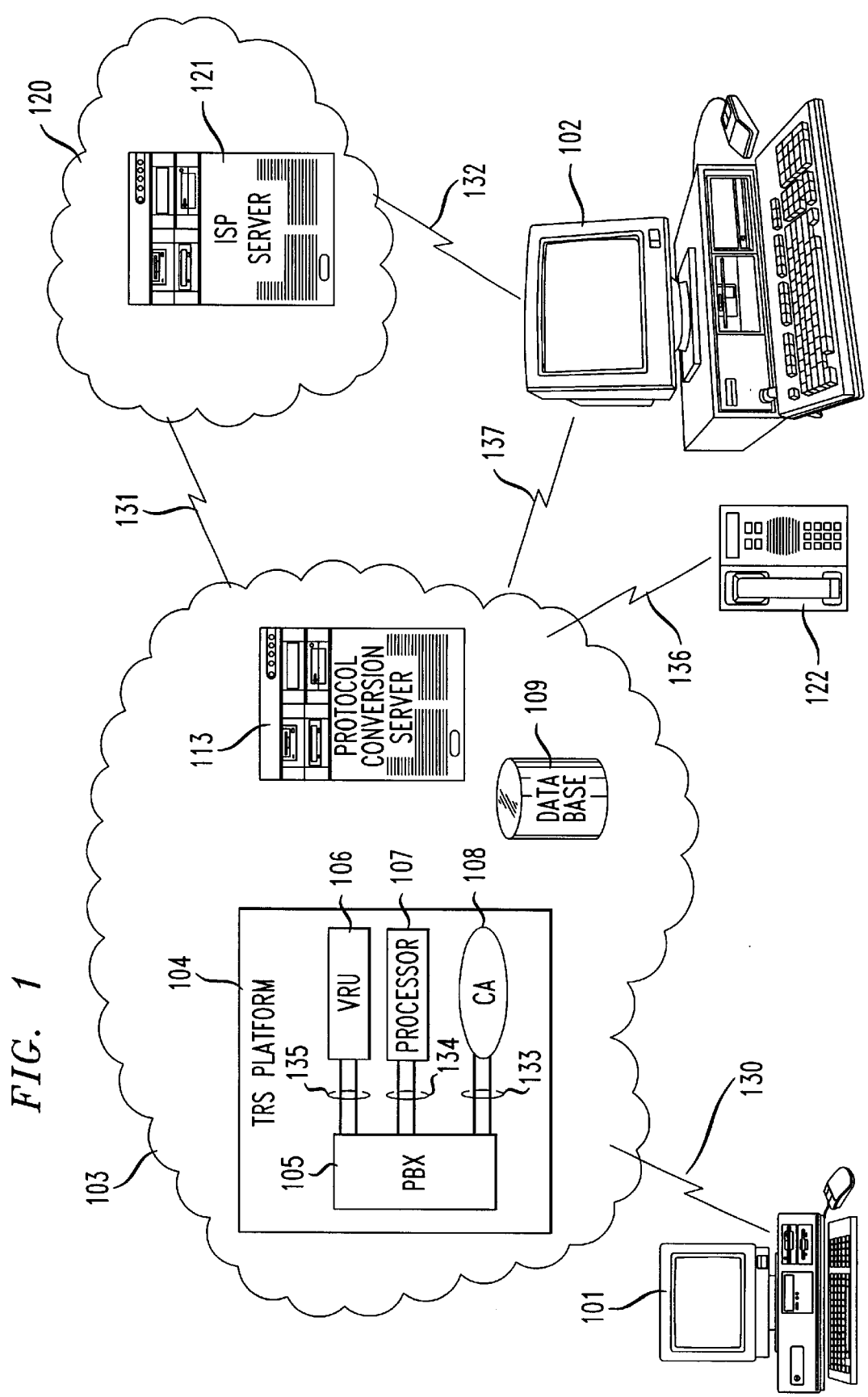
FIG. 1 is a simplified functional block diagram of a communication system using an internet capable device, such as a personal computer, to communicate with a TTY device over the internet.

FIG. 1 is a simplified functional block diagram of a communications network that is arranged to implement the principles disclosed herein. Shown in FIG. 1 is a TTY 101, which is coupled to a communications carrier network 103 via a twisted pair loop 130. Communications carrier network 103 includes a TRS platform 104, a database 109 and a protocol conversion server 113. The TRS platform 104 includes a PBX 105, communications assistant position 108, a processor 107 and a Voice Response Unit (VRU) 106. PBX 105 is a premises-based voice switching system which includes a modem pool (not shown) to which are directed all TDD calls. PBX 105 serves as the switching center or traffic cop for TDD calls. PBX 105 is equipped with an automatic call director facility arranged to facilitate the transfer of calls from one incoming channel of a trunk group (133 to 136) to an outgoing channel of another trunk group (133 to 135). PBX 105 switches incoming calls from TTY 101 to processor 107 for further processing. Correspondingly, calls from a conventional telephone set, such as set 122 that are destined for TTY 101 are directed to VRU 106 for delivery of announcements or to CA position 108 for live attendant assistance. Persons skilled in the art would readily recognize that the functions performed by PBX 105 could be adequately and cost-effectively performed by a central office switch with call director functionality.

VRU 106 is a processor-controlled voice information system that is driven by system software comprised of commands to i) answer incoming calls, ii) direct callers to enter specific information to process their calls, iii) initiate calls, and iv) transfer calls to other components of TRS platform 104. VRU 106 may be implemented using the Lucent Technologies Conversant® Voice Information System whose architecture and features are described in *AT&T Technical Journal*, Vol. 65, Issue 5, pp. 34–47, Sep/Oct. 1986.

Communications carrier network 103 also includes database 109 and protocol conversion server 113. Database 109 is a processor-controlled database management system that maps subscribers' telephone numbers to their names and/or IP addresses. Although database 109 is shown located within communications carrier 103, it is to be understood that database 109 may also be a server within Internet network 120 that may be accessed via a website with a known Universal Resource Locator (URL). Protocol conversion server 113 is a conventional computer that serves as a gateway between the Internet network 120 and the communication carrier network 103. Protocol conversion server 113 also executes software instructions designed to convert Baudot-formatted data to ASCII-formatted data when TTY 101 can only send and transmit Baudot-formatted data. Other functions performed by protocol conversion server 113 include forming IP packets for ASCII-formatted data destined for Internet network 120 and de-packetizing IP data packets received from Internet network 120 prior to converting such data to Baudot format. It is also worth noting that some TTYs use improved Baudot formats, such as the so-called "Turbocode®" used by TTYs from Ultratec Corporation. The protocol conversion functions performed by server 113 also extend to the enhanced Baudot formats.

FIG. 1 also shows Internet network 120 to which is coupled a workstation 102. Those skilled in the art know that the Internet is actually a network of interconnected processors through which data is exchanged between such processors and other networking devices such as routers, using the well-known TCP/IP protocol. The Internet has several access points through which data can be sent and received. For the sake of simplicity, a single access/egress point is shown as Internet Service Provider (ISP) processor 121. The processors of the Internet are linked in such fashion that data packets that are addressed to a particular IP address are routed through one or more hops by these processors and routers and delivered to the proper address.

Figure 2:
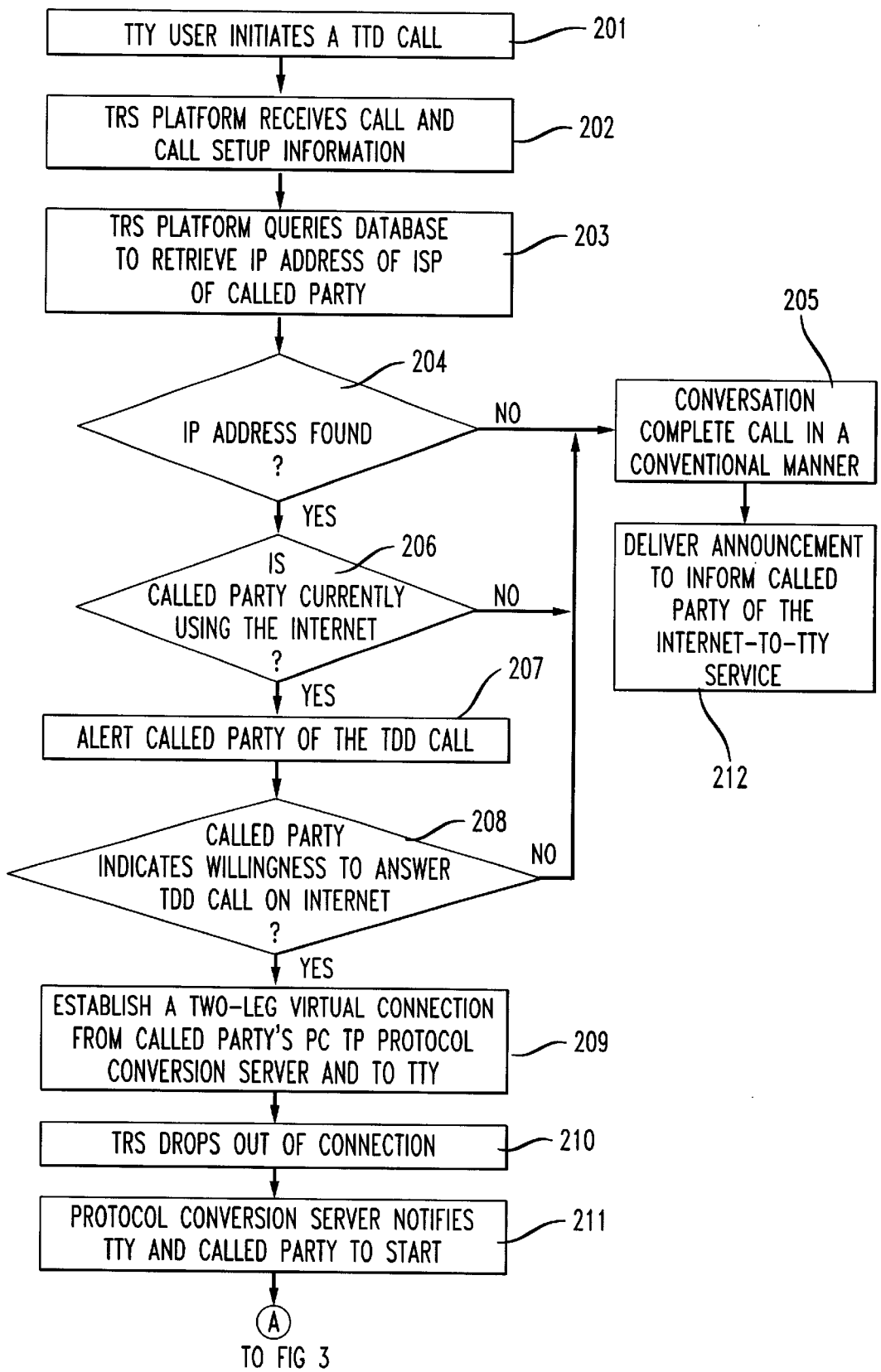
FIGS. 2, 3 and 4 illustrate programmed instructions executed by different components of FIG. 1 to implement the principles disclosed herein.

As shown in FIG. 2, the process contemplated by this disclosure is initiated in step 201 when a sound-impaired person at TTY 101 initiates a TDD call that is destined for telephone set 122. The TDD call is established according to a two-phase process. In a first phase, as indicated in step 202, a first connection is established to TRS platform 104 or more specifically to PBX 105. Upon determining that the call is a TDD call, PBX 105 transfers the call to processor 107 which invites the sound-impaired caller to type the telephone number and optionally the name of the called party. Upon receiving the called party number, processor 107 in step 203, launches a query to database 109 to retrieve the IP address of the called party. The aforementioned database search-can be accomplished in many ways, including accessing an Internet website to find the IP address associated with the telephone number and/or name provided by the TDD caller. If no IP address can be found for the called party, as determined in step 204, the call is transferred to CA position 108 for the call to be completed in a conventional manner, as indicated in step 205. In a departure from the prior art, the communications assistant may inform the called party that calls to and from a sound-impaired person can be completed with complete privacy and at cheaper rates by accessing a particular website at protocol conversion server 113. Alternatively, VRU 106 may deliver an announcement to the called party giving such called party the choice of either using the conventional services of the communications assistant, or accessing the web site at protocol conversion server 113 to communicate with the TDD caller. The announcement would include the Universal Resource Locator (URL) of the Internet-TDD website on the protocol conversion server 113. If the called party elects to communicate with the TDD caller via the Internet, VRU 106 would transfer the call to protocol conversion server 113 for further processing.

If an IP address is found for the called party, processor 107, in step 206 further determines whether the called party is currently using the Internet. If the user is currently using the Internet, as determined in step 206, processor 107 in step 207 alerts the called party of the call in waiting. The aforementioned alert may take the form of an electronic mail message that is sent to the called party. The electronic message may indicate to the called party that a TDD call destined for him or her is waiting to be completed and conversation can start as soon as he or she joins the caller in a chat room or private room at a particular Universal Resource Locator (URL) associated with protocol conversion server 113.

When processor 107 receives a signal indicative of the called party's willingness to answer the TDD call, as determined in step 208, processor 107 in step 209 establishes an Internet connection from the called party's Personal Computer (PC) through the protocol conversion server 113 to TTY 101. Immediately thereafter, processor 107 in step 210 drops out of the connection. Once the Internet connection is established protocol conversion server 113 in step 211 notifies the calling and called parties that they can start their private conversation.

If processor 107 receives no signal indicative of the called party's willingness to answer the TDD call, as determined in step 208, then processor 107 in step 205 transfers the call to CA position 108 for the call to be answered in a conventional manner. Similarly, if the called party is an Internet subscriber but is not currently using the Internet, as determined in step 206, processor 107 in step 205, transfers the call to attendant position 108 for the call to be answered in a conventional manner. The CA handling the call may, in step 212, advertise the Internet-TDD service to the called party before the conversation between the two parties begins.

Figure 3:
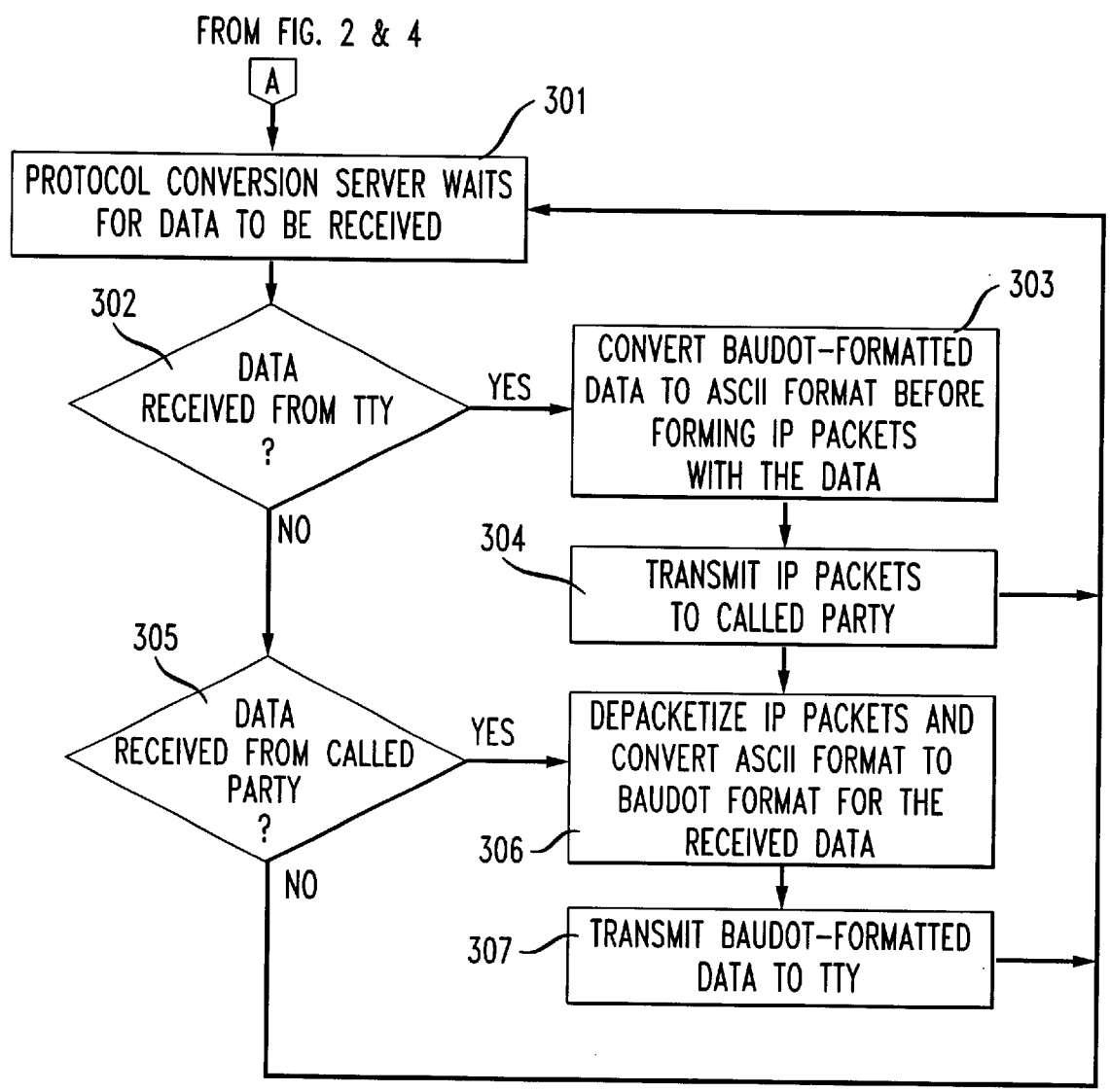

The manner in which a TDD call is carried over the Internet is described in FIG. 3. Once an Internet virtual communications path is established between the calling and called parties (TTY 101 and workstation 102, respectively), the protocol conversion server 113 and the Internet Service Provider (ISP) server 121, the protocol conversion server 113, in step 301 waits for data to be received therein. When Baudot-formatted data from TTY 101 is received at the protocol conversion server 113, as determined in step 302, such data is converted by the protocol conversion server 113 into ASCII format in step 303, before protocol conversion server 113 forms IP packets with the ASCII-formatted data. Thereafter, protocol conversion server 113, in step 304, transmits the IP packets to workstation 102 via ISP server 121 and communications line 132. Those skilled in the art would readily recognize that when the data received from TTY 101 is already in ASCII format (since some newer model TTY devices send and receive ASCII characters as opposed to Baudot tones), no protocol conversion function needs to be performed by server 113.

When IP packets are received from workstation 102 by protocol conversion server 113, as determined in step 305, protocol conversion server 113, in step 306, de-packetizes such IP packets and converts the ASCII data contained in those packets into Baudot-formatted data. Thereafter, protocol conversion server 113, in step 307, transmits the Baudot-formatted data to TTY 101. No protocol conversion function is performed when TTY 101 can process ASCII-formatted data.

Figure 4:
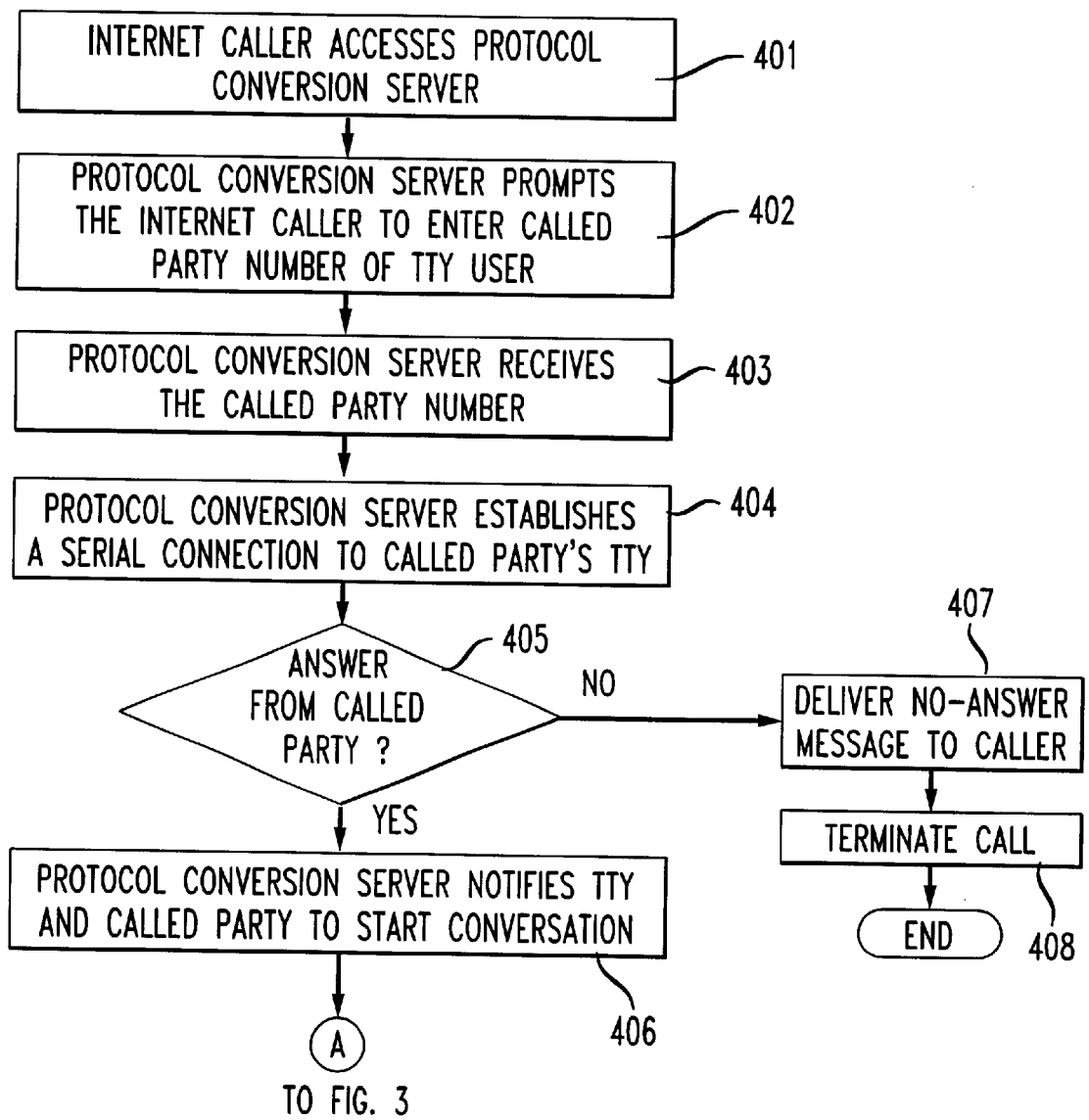

FIG. 4 illustrates a process by which an Internet caller can complete a TDD call. The process is initiated in step 401 when an Internet caller establishes a connection to ISP server 121 to access a web site at protocol conversion server 113. The process of establishing a connection to a web site may require a caller to provide a password or Personal Identification Number (PIN) for billing and/or security purposes. Once the web site is accessed, the caller is prompted in step 402 to provide the telephone number of the sound-impaired called party. Once the protocol conversion server 113 receives the called party number in step 403, protocol conversion server 113 establishes a serial port connection to TTY 101, as indicated in step 404. Upon receiving a signal from TTY 101 indicative of the called party's willingness to answer the call as determined in step 405, protocol conversion server 113, in step 406, notifies TTY 101 and workstation 102 that data can be freely and privately exchanged between these two devices. If no signal indicative of the called party's willingness to answer the call is received by protocol conversion server 113, as determined in step 405, protocol conversion server 113 sends a standardized message to the caller to inform the caller that the called party is unavailable. Optionally, protocol conversion server 113 may invite the caller to type a message for the called party for delivery at a later time.

The foregoing merely illustrates certain aspects of the principles disclosed herein. Persons skilled in the art will be able to devise numerous arrangements which, although not explicitly shown or described herein, embody the principles disclosed herein, and are within the spirit and scope of the present disclosure.

What is claimed is:

1. A method implemented by a communications services provider for completing a call from a sound-impaired person to a sound-unimpaired person, said method comprising the steps of:
   receiving at a communications services provider's network call setup information for an incoming call that a) is initiated by a sound-impaired person from a TTY device, and b) is destined for a called party who is a sound-unimpaired person;
   ascertaining via the Internet whether said called party is currently using the Internet; and
   in response to receiving a signal indicative of said user currently using the Internet, completing said call to said called party via a communications path which includes an Internet connection.

2. The method of claim 1 wherein said completing step further comprises the steps of:
   converting data received from said caller from Baudot-format to ASCII format; and
   converting data received from said called party from ASCII format to Baudot-format.

3. The method of claim 1 wherein said communications path includes a circuit-switched connection that extends from said TTY device to a gateway of said communications service provider network.

4. The method of claim 1 further comprising the step of:
   alerting said called party of the call from the sound-impaired person via an electronic message that is delivered substantially immediately to the called party via the Internet.

5. A method implemented by a communications services provider for completing a call from a caller who is a sound-unimpaired individual to a called party who is a sound-impaired person, said method comprising the steps of:

receiving at a processor of said communications services provider call setup information for said call, said call setup information a) being received via a packet-switched connection from a device being used by said caller to said processor and b) being comprised of a telephone number of said called party;

establishing a circuit-switched connection from said processor to a TTY of said called party; and transmitting a) IP data received from said caller to said called party via said circuit-switched connection and b) TTY data received from said called party to said caller.

6. The method of claim 5 wherein said transmitting step includes the step of:

converting said IP data into Baudot-formatted data before said transmission.

7. The method of claim 5 wherein said TTY data is in Baudot format.

8. The method of claim 7 further comprising the step of converting said TTY data from Baudot-formatted data to IP data before said transmission.

9. A method implemented by a communications services provider for completing a call from a sound-impaired person to a sound-unimpaired person, said method comprising the steps of:

receiving at a communications services provider's network call setup information for an incoming call that is a) initiated by a sound-impaired person from a TTY device, and b) destined for a called party who is a sound-unimpaired person;

ascertaining via the Internet whether said called party subscribes to Internet service;

in response to receiving indication that said called party is an Internet subscriber who is not currently logged on the Internet, alerting said called party to the existence of said call.

10. The method of claim 9 wherein said alerting step includes the step of:

delivering an announcement to said called party via said communications services provider network, said announcement giving said called party at least two options, said options comprising a) communicating with said caller solely via said communications services provider's network, and b) communicating with said caller via the Internet and said communications services provider's network.

11. The method of claim 10 further comprising the step of completing said call via the Internet and said communications service provider's network in response to receiving a request from said called party exercising one of said options to communicate with said caller via the Internet.

12. The method of claim 11 wherein said completing step includes the step of converting data received from said caller from Baudot-format to ASCII format.

13. The method of claim 11 wherein said completing step includes the step of converting data received from said called party from ASCII format to Baudot-format.

14. A communication system for connecting a workstation with a user at a communication device suitable for use by a sound-impaired person, said system comprising:

a protocol conversion server for converting between data coded in Baudot format and data coded in IP format;

said protocol conversion server being connected to a communications channel for connecting the workstation and said protocol conversion server; and said protocol conversion server being connected to a communications carrier network for connecting the communication device and said protocol conversion server, said communications carrier network including a telecommunications relay service platform with a communications assistant position.

15. The communication system of claim 14 wherein the communication device comprises a text teletypewriter (TTY).

16. The communication system of claim 14 wherein said communications device produces text data formatted in Baudot code.

17. The communication system of claim 14 wherein said communications channel comprises an internet network.

18. The communication system of claim 17 wherein said protocol conversion server comprises a gateway between said internet network and said communications carrier network.

19. The communication system of claim 14 wherein said telecommunications relay service platform comprises a processor for establishing an internet connection from a personal computer to a TTY device.

20. The communication system of claim 14 wherein said telecommunications relay service platform comprises a voice response unit for answering incoming calls.

21. A method implemented by a communications services provider for completing a call from a sound-impaired person to a sound-unimpaired person, said method comprising the steps of:

receiving call setup information for an incoming call at a communications services provider's telecommunications relay service (TRS) platform, said TRS platform including a communications assistant position, said incoming call a) initiated by the sound-impaired person from a TTY device, and b) destined for a called party who is the sound-unimpaired person;

using the internet to ascertain, via said communications assistant position, whether said called party is currently using the internet; and in response to said communications assistant position receiving a signal indicative of said user currently using the internet, completing said call to said called party via a communications path which includes an internet connection.

22. The method of claim 21 wherein said step of completing said call comprises the steps of:

converting data received from said caller from Baudot format to IP format; and converting data received from said called party from IP format to Baudot format.

23. The method of claim 21 wherein said communications path includes a circuit-switched connection that extends from said TTY device to a gateway of said communications service provider network.

24. The method of claim 21 further comprising the step of alerting said called party of the call via an electronic message, said electronic message being sent from said communications assistant position to said called party via the internet.

25. A method implemented by a communications services provider for completing a call from a sound-unimpaired person to a called party, said method comprising the steps of:

receiving call setup information for an incoming call at a communications services provider's telecommunications relay service (TRS) platform, said TRS platform including a communications assistant position, said incoming call a) received via a packet-switched connection, said packet-switched connection between a device being used by the sound-unimpaired person and said communications assistant position, and b) including a telephone number of the called party;

said TRS platform establishing a circuit-switched connection, said circuit-switched connection from said TRS platform to a TTY of the called party; and transmitting a) IP data received from the sound-unimpaired person to the called party via said circuit-switched connection and b) TTY data received from the called party to the sound-unimpaired person.

26. The method of claim 25 wherein said step of transmitting comprises the step of converting said IP data into Baudot-formatted data prior to transmission to the called party.

27. The method of claim 25 wherein said TTY data is in Baudot format.

28. The method of claim 27 further comprising the step of converting said TTY data to IP data prior to transmission to the sound-unimpaired person.

29. A method of connecting a user at a workstation with a user at a Baudot-format communication device associated with a telephone number, said method comprising the steps of:

using a telecommunications relay service platform to establish an internet connection from the workstation to a protocol conversion server;

prompting the workstation to provide the telephone number associated with the communication device; and establishing a serial port connection from said protocol conversion server to the communication device in response to receipt of the telephone number.

30. The method of claim 29 wherein said protocol conversion server comprises means for converting data between Baudot format and IP format.

31. The method of claim 29 further comprising the step of converting data in Baudot format to data in IP format.

32. The method of claim 29 further comprising the step of converting data in IP format to data in Baudot format.

\* \* \* \* \*